(12) United States Patent
Walker

(10) Patent No.: US 10,867,002 B1
(45) Date of Patent: Dec. 15, 2020

(54) REAL ESTATE SEARCH INTERFACE AND METHOD

(71) Applicant: Ray A. Walker, Houston, TX (US)

(72) Inventor: Ray A. Walker, Houston, TX (US)

( * ) Notice: Subject to any disclaimer, the term of this patent is extended or adjusted under 35 U.S.C. 154(b) by 0 days.

(21) Appl. No.: 16/219,662

(22) Filed: Dec. 13, 2018

Related U.S. Application Data

(60) Provisional application No. 62/598,543, filed on Dec. 14, 2017.

(51) Int. Cl.
*G06Q 50/16* (2012.01)
*G06F 16/9538* (2019.01)
*G06F 16/904* (2019.01)
*G06F 16/9537* (2019.01)
*G06F 16/908* (2019.01)

(52) U.S. Cl.
CPC ........ *G06F 16/9538* (2019.01); *G06F 16/904* (2019.01); *G06F 16/908* (2019.01); *G06F 16/9537* (2019.01); *G06Q 50/16* (2013.01)

(58) Field of Classification Search
CPC ............... G06F 16/9538; G06F 16/904; G06F 16/9537; G06F 16/908; G06Q 50/16
See application file for complete search history.

(56) References Cited

U.S. PATENT DOCUMENTS

| | | | | |
|---|---|---|---|---|
| 7,917,490 B2* | 3/2011 | Norris | ................. | G06F 16/9537 707/707 |
| 8,166,410 B2* | 4/2012 | Tadman | ............... | G01C 21/343 701/425 |
| 9,262,446 B1* | 2/2016 | Katragadda | ........... | G06F 16/957 |
| 2007/0100802 A1* | 5/2007 | Celik | ................... | G06Q 10/087 |
| 2008/0059889 A1* | 3/2008 | Parker | .................... | G06F 16/29 715/748 |
| 2011/0125856 A1* | 5/2011 | Chu | ..................... | G06Q 10/107 709/206 |
| 2011/0208617 A1* | 8/2011 | Weiland | ................. | G06Q 30/00 705/27.1 |
| 2011/0289106 A1* | 11/2011 | Rankin, Jr. | ............ | G06Q 10/10 707/769 |
| 2013/0060912 A1* | 3/2013 | Rensin | ............... | H04N 21/2408 709/219 |

(Continued)

OTHER PUBLICATIONS

Definition of "Neighborhood", Dictionary.com, retrieved on May 11, 2020 from https://www.dictionary.com/browse/neighborhood (Year: 2020).*

(Continued)

*Primary Examiner* — Shourjo Dasgupta
(74) *Attorney, Agent, or Firm* — Daniel N. Lundeen; Lundeen & Lundeen PLLC

(57) ABSTRACT

A graphical user interface showing real estate search results on an interactive display device in which a user selects from predefined search zones sub-level neighborhood search areas, and the search results comprise real property listings retrieved by a computerized search of one or more electronic databases which include real property listings from home construction providers, real property listings under construction, prospective real property listings on which construction has not begun, real property listings available for construction, prospective real property listings not having an assigned physical address, or a combination thereof.

21 Claims, 5 Drawing Sheets

(56) References Cited

U.S. PATENT DOCUMENTS

| | | | | |
|---|---|---|---|---|
| 2013/0191205 | A1* | 7/2013 | Harkless, II | G06Q 30/0239 |
| | | | | 705/14.39 |
| 2014/0188573 | A1* | 7/2014 | Avey | G06Q 10/0639 |
| | | | | 705/7.39 |
| 2014/0280180 | A1* | 9/2014 | Edecker | G06F 16/9535 |
| | | | | 707/740 |
| 2015/0106278 | A1* | 4/2015 | Florance | G06Q 10/067 |
| | | | | 705/313 |
| 2015/0204685 | A1* | 7/2015 | Gearhart | G01C 21/36 |
| | | | | 701/533 |
| 2015/0300837 | A1* | 10/2015 | Hisano | G06Q 30/0266 |
| | | | | 701/454 |
| 2016/0048874 | A1* | 2/2016 | Brajer | G06Q 30/02 |
| | | | | 705/14.54 |
| 2016/0364740 | A1* | 12/2016 | Parker | G06Q 30/0205 |
| 2018/0011934 | A1* | 1/2018 | Stapleton | G06F 16/951 |
| 2018/0283889 | A1* | 10/2018 | Koo | G01C 21/3484 |

OTHER PUBLICATIONS

Screenshot from Neighborhoods.com, retrieved on May 11, 2020 from https://www.neighborhoods.com/find/top-neighborhoods (Year: 2020).*

"Neighborhoods.com—Find the Perfect Neighborhood and Home", YouTube, posted on Jan. 25, 2016 to https://www.youtube.com/watch?v=cSfOKQrelxw, retrieved on May 11, 2020 (Year: 2016).*

* cited by examiner

REAL ESTATE SEARCH INTERFACE AND METHOD

BACKGROUND

Numerous on-line and computerized real estate services exist. Searching for real estate listings is typically conducted via a computerized search of an electronic database provided by one or more multiple listing services (MLS) which include the physical location and other relevant information of real property listings. Each listing may also include information directed to various attributes of the property, the listing status of the property, and the like. However, individual new home construction listings and prospective listings of properties under development or under construction are typically excluded from or underrepresented in MLS listing services. When present, new home construction listings are often combined into a single general listing without information directed to the specific attributes typically of interest to home buyers, which may be due to a disparity in realtor commissions between new properties and existing property listings typically present in multiple listing services.

Furthermore, real estate searching is typically conducted based on a distance from a particular location. For example, listings are retrieved within a circle or regular polygon shaped search area selected on a map. Such searches ignore the various geographic zones which exist within man made and/or natural boundaries, and the sub-level neighborhood search areas located within a particular search zone. By ignoring the various search zones and sub-level neighborhoods present therein, such searches fail to provide the end user with information relative to the physical boundaries which may impede travel to and from or in an out of a particular zone, as well as the political, cultural, and economic similarities common to a particular sub-level neighborhood search area, which have developed for numerous reasons in a particular locality.

By excluding or grouping individual listings directed to new home construction, such searches further limit the information available to the end user on new properties, but instead presents data weighted to existing real estate listings represented on both ends of the transaction by realtors. This is especially true to end users whom are not familiar with a particular area of interest, the neighborhoods, and the names of new home developments present in the area, and the like. There is a need in the art to provide as much relevant information as is possible to users searching real estate listings.

SUMMARY

In embodiments a graphical user interface comprising real estate search results on an interactive display device comprises a plurality of user selectable, predefined search zones displayed on a geographic map, each search zone comprising at least one user selectable sub-level neighborhood search area comprising a predefined geographical area unified under a single neighborhood name bounded by the search zone; a search interface configured for a user input of at least one additional search criteria and for user initiation of a computerized search of the search area for real property in one or more electronic databases to produce the search result, the search result comprising user selectable real property listings physically located within the selected search area which satisfy the at least one additional search criteria; the one or more electronic databases comprising real property listings from home construction providers, real property listings under construction, prospective real property listings on which construction has not begun, real property listings available for construction, prospective real property listings not having an assigned physical address, or a combination thereof.

In embodiments, a method for searching multiple listings comprises providing one or more electronic databases comprising real property listings from home construction providers, real property listings under construction, prospective real property listings on which construction has not begun, real property listings available for construction, prospective real property listings not having an assigned physical address, or a combination thereof; providing a graphical user interface comprising a plurality of user selectable, predefined search zones displayed on a geographic map, each search zone comprising at least one user selectable sub-level neighborhood search area comprising a predefined geographical area unified under a single neighborhood name bounded by the search zone; a search interface configured for a user input of at least one additional search criteria and for user initiation of a computerized search of the search area for real property in one or more electronic databases to produce the search result, the search result comprising user selectable real property listings physically located within the selected search area which satisfy the at least one additional search criteria; receiving a selection of at least one sub-level neighborhood search area, at least one additional search criteria from a user, receiving a user search initiation input; conducting a computerized search of the one or more electronic databases to produce the search result comprising real property listings retrieved from the one or more electronic databases which include real property listings present in the selected search area which satisfy the at least one additional search criteria, and updating the display with a selectable results list comprising the real property listings of the search result.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings.

DETAILED DESCRIPTION

Figure 1:
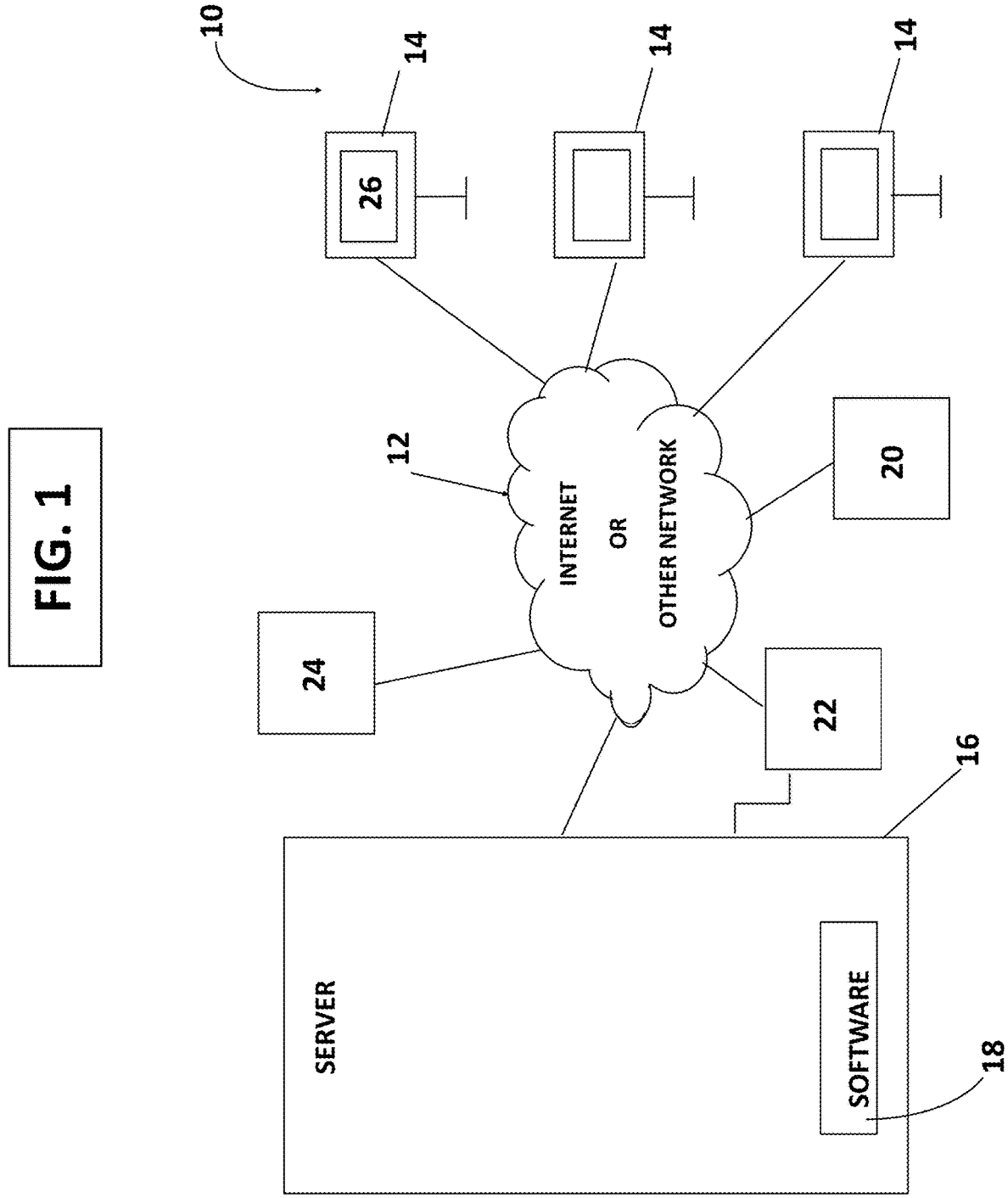
FIG. 1 shows a system with client computers interacting with a server over a network, the server in communication with one or more electronic databases from a multiple listing service comprising a plurality of real property listings and an electronic database of real properties available from one or more new home construction subscribers, including multiple listings from the same new home construction subscriber, in which each real property listing has a physical location.

While preferred embodiments of the present invention have been shown and described herein, it will be obvious to those skilled in the art that such embodiments are provided by way of example only. Numerous variations, changes, and substitutions will now occur to those skilled in the art without departing from the instant disclosure. It should be understood that various alternatives to the embodiments described herein may be employed in practice thereof.

Definitions

For purposes herein, an interactive displays device includes any device upon which information may be collected, displayed, and/or manipulated in a manner perceptible to a user. Embodiments according to the instant disclosure are not limited to the type of interactive display device utilized by the end user.

Examples of suitable interactive displays devices include a computer monitor, touchpad, and/or touchscreen display electronically connected to a client computer, a smartphone, a tablet, and/or other means known in the art capable of receiving, processing, and displaying electronic data in a visually perceptible and/or audible manner.

In embodiments, a display page according to embodiments disclosed herein may include a computer file residing in memory which may be transmitted from one or more servers over a network to the end user's interactive display device, e.g., the client computer, which can store it in memory. The client computer may receive computer readable media, which may contain instructions, logic, data, and/or code that may be stored in persistent or temporary memory of the client computer, or which is actionable by the client computer to affect or initiate action by the client computer.

For purposes herein, one or more servers may communicate with one or more client computers across one or more networks, and may transmit computer files residing in memory. The network, for example, can include the internet, any other wide area network (WAN), a local area network (LAN), a cloud based network, or any network for connecting one or more clients to one or more servers or other computers. In some alternate embodiments, a client computer need not interact with another computer, but may be self-contained.

For purposes herein, the display page provided to the user by the interactive electronic device may be interpreted by software residing on a memory of the client computer, causing the computer file to be displayed on a video display in a manner perceivable by a user. For purposes herein, the interactive display device, may be any client data processing device and may also apply to any type of networked device, including but not limited to a personal computer, server computer, or laptop computer; personal digital assistants (PDAs), a smart phone, a tablet, or location-aware hand held electronic device, such as GPS device, a network-connected roaming device; a wireless device such as a wireless email device or other device capable of communicating wireless with a computer network; via a cloud based network, or any other type of network device that may communicate over a network and handle electronic transactions.

For purposes herein, display pages be created using a software language known in the art such as, for example, hypertext mark-up language ("HTML"), dynamic hypertext mark-up language ("DHTML"), extensible hypertext mark-up language ("XHTML"), extensible mark-up language ("XML"), and/or other software language suitable to create a computer file displayable on a video display in a manner perceivable by a user. Accordingly, embodiments disclosed herein are not limited by the type of computer readable media, logic, code, data, instructions, and the like, which may be used to implement any software, steps, or methodology according to embodiments disclosed herein.

For purposes herein, when the network comprises the internet, a display page may comprise a webpage of a type known in the art, which may utilize any known software program to produce the display. The display page may comprise well known features of graphical user interface technology, such as, for example, frames, windows, tabs, scroll bars, buttons, icons, menus, fields, and hyperlinks, and well-known features such as a "point and click" interface.

For purposes herein, selection and/or input by a user refers to the user entering data in via keyboard or voice active command, pointing to and clicking on a graphical user interface button, icon, menu option, or hyperlink, also is known as "selecting" the button, icon, option, or hyperlink, and the like. Additionally, a "point and gesture" interface may be utilized, such as a hand-gesture driven interface and/or audible selections may be made according to voice driven interfaces known in the art.

Any other interface for interacting with a graphical user interface may be utilized. A display page according to the invention also may incorporate multimedia features including video display and/or a display page as known in the art, utilizing any web browser known in the art, or which may be subsequently developed.

For purposes herein, the user interface may be used to display or provide access to real property data, which may be provided via a web page or via an application controlling the interactive display device which may be remotely or locally accessed.

For purposes herein, a search zone comprises one or more sub-level neighborhood search areas. A search zone may also be referred to as a "super neighborhood". Each sub-level neighborhood search area comprises a predefined geographical area bounded by the search zone and which represents a predefined geographical area unified under a single neighborhood name. It is to be understood that sub-level neighborhoods may be further divided into particular search areas.

It is understood that for purposes herein, parity migration and/or upgrading may occur from one mapping platform, server platform, web browser, network infrastructure, and/or other functionality utilized according to embodiments disclosed herein. Parity migration may include the replacement of any functionality utilized according to embodiments disclosed here for another improved or otherwise more desirable functionality. For example, parity migration may include the replacement of any mapping platform with another mapping platform. Parity migration may or may not include new functionality or may occur to enable new functionalities that may not be available with a previous technology.

As used herein, a new home construction subscriber refers to any person or legal entity which is associated with providing new homes for sale. These may include builders, contractors, land developers, agents, trade organizations, guilds, associations, and the like. In embodiments, a subscriber may be a user which pays for a particular service or access to a particular database. In other embodiments, a subscriber may be provided access free of charge or anonymously. Accordingly, for purposes herein, one of the provided databases may be accessible to any home builder, developer, or other subscriber which desires to have their listings included in any search conducted via the user interface or any method according to the instant disclosure.

In an embodiment, a graphical user interface showing real estate search results on an interactive display device, the graphical user interface comprises a plurality of user selectable, predefined search zones displayed on a geographic map, each search zone comprising at least one user selectable sub-level neighborhood search area, wherein each sub-level neighborhood search area comprises a predefined geographical area bounded by the search zone which represents a predefined geographical area unified under a single neighborhood name, and a search interface configured for user input of at least one additional search criteria and for user initiation of a computerized search of real property listings in one or more electronic databases to produce a search result.

In embodiments, the interface may be configured such that a user selection of a search area comprising one or more search zones and/or one or more sub-level neighborhood search areas results in the geographic map displaying the bounds of the selected search area, which is displayed on the geographic map in context to non-selected search zones and non-selected sub-level neighborhood search areas that are also displayed on the geographic map. In embodiments, the interface may be configured such that initiation of a search by the user retrieves real property listings which satisfy the at least one additional search criteria, which are physically located within the selected search area, and updating the display with a selectable results list comprising the real property listings of the search result. In embodiments, at least one data base searched comprises, consists essentially of, or consist of property listings and real property listings from home construction providers, real property listings under construction, prospective real property listings on which construction has not begun, real property listings available for construction, prospective real property listings not having an assigned physical address, or a combination thereof. In embodiments, one or more electronic databases searched include real property listings from a multiple listing service.

In embodiments, the search results comprising real property listings are retrieved by a computerized search of one or more electronic databases which include real property listings from new home construction subscribers, including prospective real property listings under construction, multiple real property listings from the same new home construction subscriber in addition to existing real property listings provided by one or more multiple listing services. Subscribers which provide listings for search to the databases may further include those listing properties in a for sale by owner capacity.

In embodiments, the interface is configured to eliminate duplicate results from results list prior to displaying the results list to the end user.

In embodiments, a selection of a real property listing by the user from the results list updates the geographic map to further comprise at least one status flags indicating a physical location of the selected real property listing from the results list, the status flag further indicating an attribute, a listing status, or both, of the corresponding real property listing. In embodiments, a user selection of the search zone results in an update of the geographical map display to show the user selectable sub-level neighborhood search areas present in the selected search zone.

In embodiments, at least one of the sub-level neighborhood search areas is unified under a name of a real-estate development located within the defined geographic area. In embodiments, the graphical user interface further comprises additional geographic information that is integrated into the geographic map. In embodiments, the additional geographic information includes indications which show school district boundaries, demographic information, heat maps, parcel boundaries, tax information, or a combination thereof, on the geographic map. In embodiments, one or more of the additional geographic information is displayed in one or more data layers on the geographic map, and wherein the user may select at least one additional geographic information to display on the geographic map.

In embodiments, a search zone comprises one or more sub-level neighborhood search area comprises a predefined geographical area bounded by the search zone and which represents a predefined geographical area unified under a single neighborhood name. In embodiments one or more sub-level neighborhoods may be further divided into smaller search areas. In embodiments, the smaller search areas may be limited to one or more particular new home providers, e.g., a particular builder's section of a larger planned neighborhood.

In embodiments, the geographic map is integrated with at least one pre-existing map feature on the display device, and with at least one pre-existing toolbar.

In embodiments, the graphical user interface is configured to allow the user to select which real property listings to visit, and wherein the display includes a travel route which directs the user from a starting point to the physical location of each of the selected real property listings in the search results. In embodiments, the travel route comprises computer readable instructions downloadable into, and actionable by a portable electronic device capable of utilizing a GPS system to provide real-time navigational directions, wherein the instructions guide the user along the travel route to the physical location of each of the selected real property listings in the search results, and wherein the starting point is determined relative to the user's physical location. In embodiments, the computer readable instructions provide the user with a displaying of a visual image, a playing of an audio description, a playing of a video tour, or a combination thereof on the portable electronic device when the physical location of the user is proximate to the physical location of the corresponding real property listing.

As shown in FIG. 1, the graphical user interface 10 provided according to embodiments disclosed herein may be displayed across a network 12 such as the internet via a webpage 26 displayed in a web browser resident on the client computer 14. The server 16 comprising software 18 utilized by the graphical user interface may be connected via the internet or other network 12 to the various databases 20 and 22 comprising the real property listings, and/or the server 16 may be directly connected to one or more of the various databases, e.g., in FIG. 1 sever 16 is shown with a direct connection to database 22. Server 16, and/or client computer 14 may be connected via the internet to any additional server, software provider, and/or database, indicated as item 24, which is utilized by the graphical user interface.

In embodiments, graphical interface may utilize any mapping function or pre-existing mapping application known in the art, such as Google Maps®, Google Earth®, and/or the like, which in embodiments may include custom mapping applications and/or data sets employed by the graphical interface according to embodiments disclosed herein. In embodiments, any resident mapping solutions may assist with displaying a geographic map and/or handling geographic information according to embodiments disclosed herein.

In embodiments, the graphical user interface may further include software which utilizes any features of a mapping solution or application, including affiliated technologies, programs, servers, datasets, and the like. In embodiments, the mapping function may include various viewing options including pan, zoom, 2D, 3D, satellite, hybrid, and the like, known in the art. Accordingly, in embodiments, the graphical user interface may include a geographic map, which may be integrated with any number of pre-existing or subsequently developed map features, including any number of pre-existing or subsequently developed toolbars, search bars, apps, and the like.

In embodiments, a user may use one or more embodiments of the graphical interface to search real property listings. A user may be anyone capable of interacting with the graphical user interface. In embodiments, the graphical user interface may have an access-only component provided to subscribers and may have a public component available to any party. Alternatively, the graphical user interface may be accessible to subscribers only, or may be completely accessible to the public.

An end user may include a subscriber. For example, subscribers may include agents and/or appraisers who may use the system to search properties. This may include an agent, broker representative, appraiser, appraiser representative, and all internal users. Subscribers may also include special users who have standard access like duplicates, teams, associations, and assessors, including special users who have a subset of access like assistants.

A user may also include any member of the public that may access the graphical user interface. For example, prospective buyers, sellers of real property may have partial or complete access to the graphical user interface.

Users may utilize the graphical user interface in any manner consistent with the laws and protections of the relevant jurisdictions. In embodiments, the access afforded to some users may be limited such that they do not have access, or have limited to access to certain features.

In embodiments, the graphical user interface may have a separate subscribers-only interface and a public interface.

In embodiments, the graphical user interface provides the user with an ability to search real property listings according to a plurality of user selectable search zones displayed on a geographical map. In embodiments, each search zone represents a predefined geographical area which may be assigned according to various natural and/or man-made barriers, and/or man-made designations. In embodiments, each search zone comprises at least one sub-level neighborhood search area. Where the search zone comprises a single neighborhood search area, the bounds of the neighborhood search area are defined by bounds of the search zone. Where the search zone includes a plurality of neighborhood search areas, each sub-level neighborhood search area comprises a smaller predefined geographical area bounded by or located within the search zone.

In embodiments, each sub-level neighborhood search area is unified by a neighborhood name. For examples, a particular geographical location bound by and located within a region surrounded by three interstate highways may be referred to as zone 1. Within zone 1 may be one or more sub-level neighborhood search areas, which include areas historically referred to by a unifying neighborhood name. Accordingly, in zone 1 may be two neighborhoods, a neighborhood historically known as "the West end" and another neighborhood known locally as "the East end".

In an example, the end user of the graphical user interface is provided with a plurality of user selectable search zones displayed on a geographical map, which include zone 1 which has been predefined for the user by one having knowledge of the area, the topography, and the local neighborhood traditions and customs. The bounds of zone 1 are indicated on the geographical map in correlation with other zones present in the area, e.g., zones 2 and 3. Within zone 1 the bounds of the predefined sub-level neighborhood search areas representing discrete geographical areas unified under a single neighborhood name are shown, and are selectable e.g., via point and click, by the user. The graphical user interface is configured such that selection of the main level zone 1, or selection of one or more sub-zones by the user results in the graphical user interface to conduct a search of the associated electronic databases for real property listings present within the selected geographical area.

In embodiments, the search criteria used to conduct the search of the associated electronic databases further includes one or more additional search criteria from the user which further limits the electronically searching criteria and further limits the listings retrieved by the search. Accordingly, the additional criteria further limit the search results produced and shown to the user. Examples include attributes such as listing price, lot size, dwelling square footage, number of bedrooms, baths, garage, and a host of other criteria typically considered in real estate transactions. In embodiments, the additional search criteria may include the listing status of the property, which may include the listing being active, pending, sold, expired, price-reduced, canceled, withdrawn, and combinations thereof.

Figure 2:
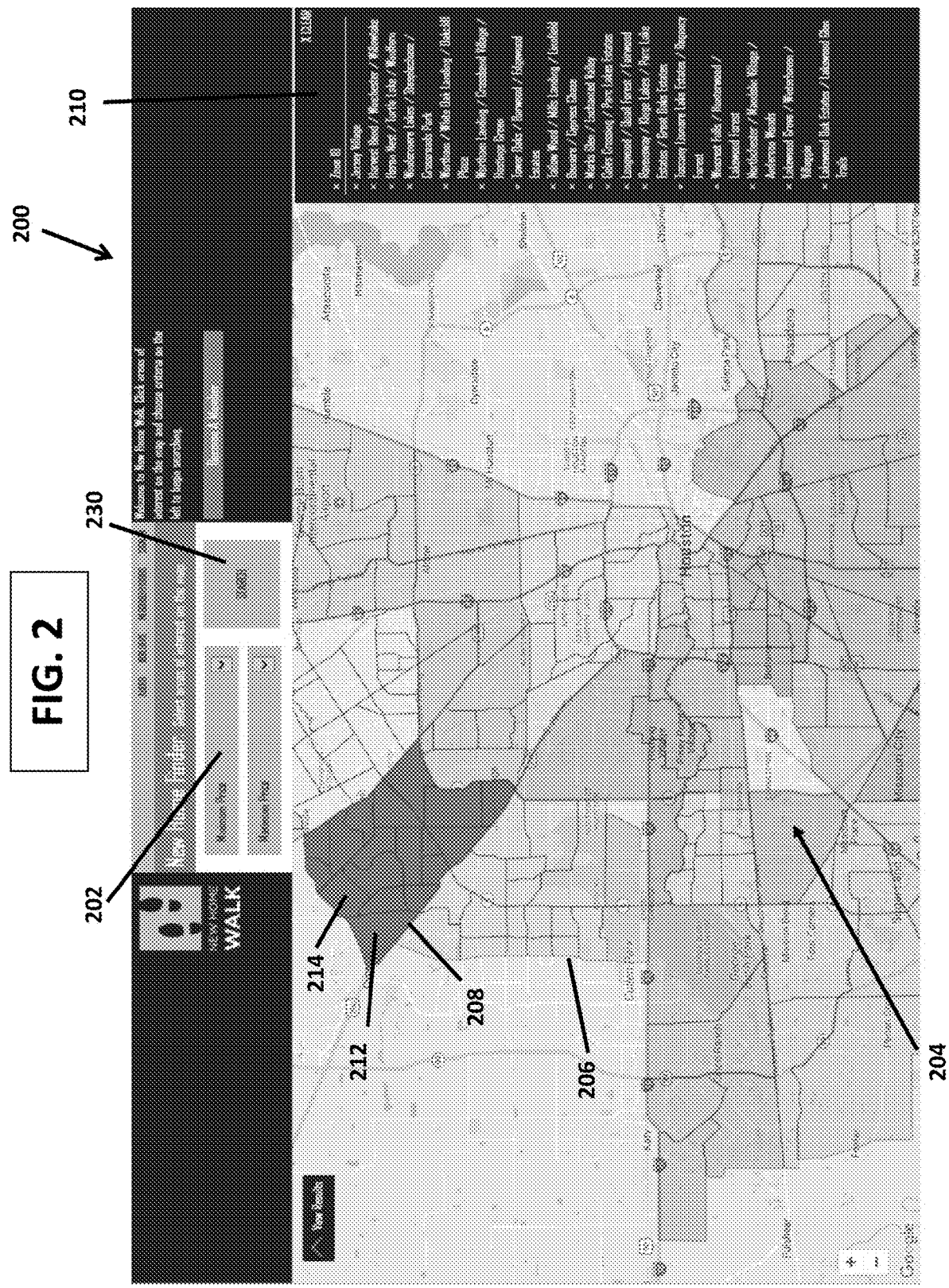
FIG. 2 shows a graphical user interface showing a plurality of user selectable search zones displayed on a geographical map, each comprising one or more sub-level neighborhood search areas representing a predefined geographical area unified under a single neighborhood name according to embodiments disclosed herein.

In the patent FIG. 2 shows an example of a display of the graphical user interface, generally referred to as 200, including a search entry interface 202 and a geographic map 204. The geographic map 204 comprises a plurality of selectable search zones 206 and 208 are further listed in a sidebar 210. These selectable search zones are further divided into sub-level neighborhood search areas two of which are shown as 212 and 214, each unified under a neighborhood name known in the area. Each of these sub-level neighborhood search areas are also listed in the sidebar 210 under the particular search zone.

Figure 3:
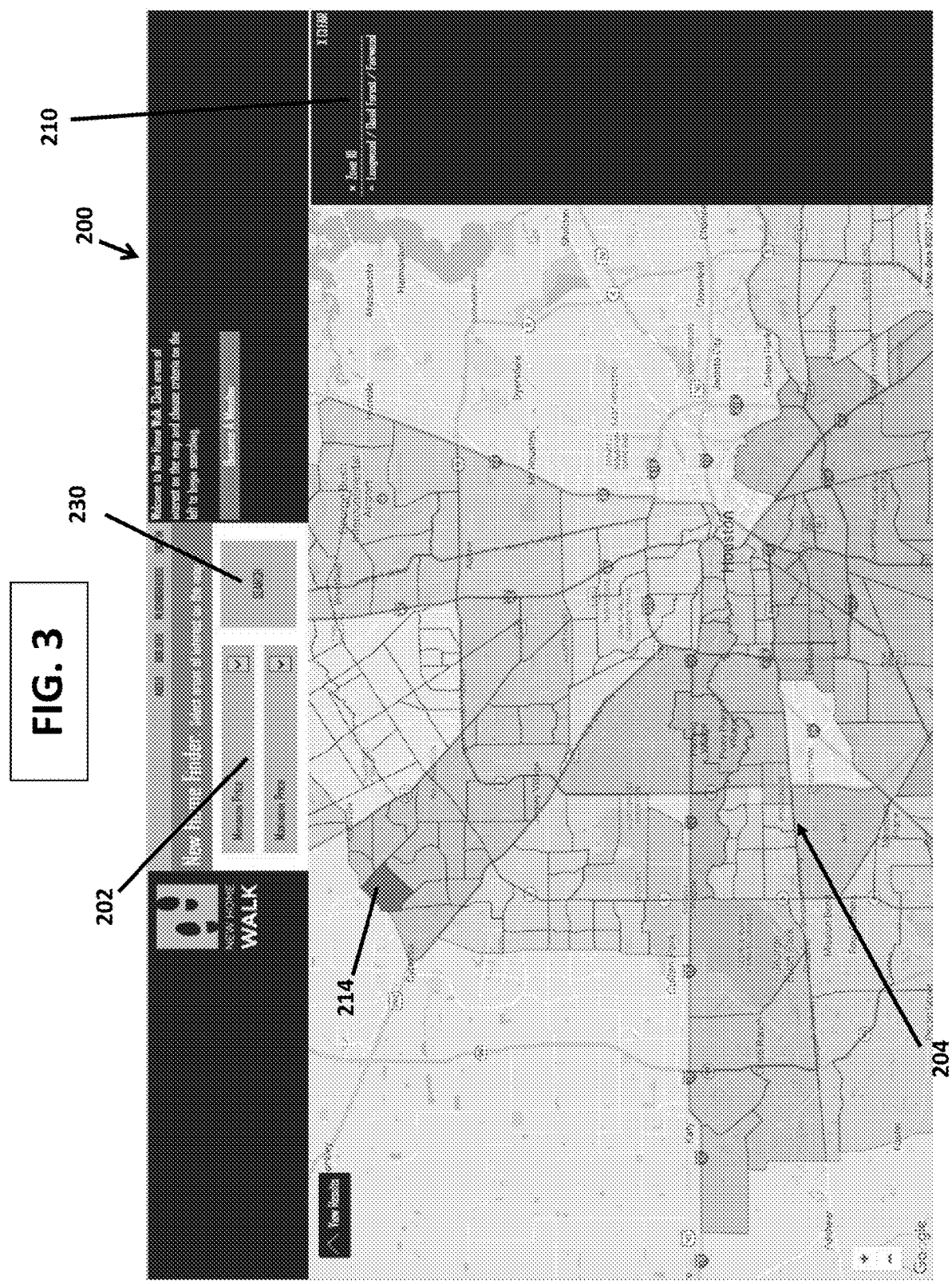
FIG. 3 shows a graphical user interface showing a user selected zone or main level neighborhood search area, and the bounds of the various sub-level neighborhood search areas located within this main level search area displayed on the geographic map in context to non-selected search areas that are also displayed on the geographic map.

As shown in FIG. 3, upon user selection of search zone 208, the bounds of the sub-level neighborhood search areas present within search zone 208 are shown on the geographic map. As is also shown in FIG. 3, in embodiments the graphical user interface further includes additional search criteria entry interface 202, which in FIG. 3 is the price range of listings, and a search initiation button 230.

Figure 4:
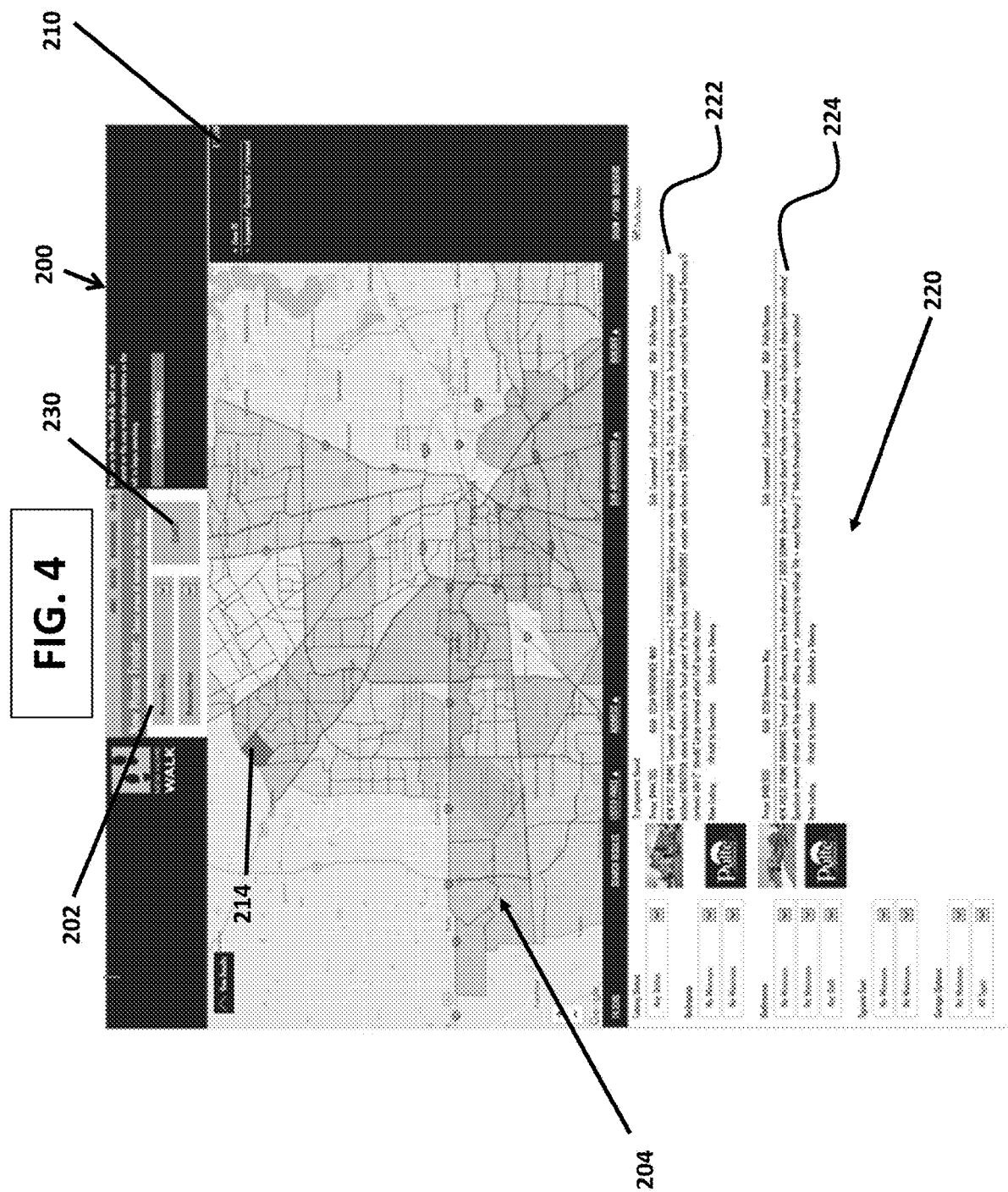
FIG. 4. shows a selectable results list of the real property listings present in search results of a selected sub-level neighborhood.

As shown in FIG. 4, upon initiation of a search of the attached databases for properties located in neighborhood 214 within the additional search criteria of having a price range of $80,000 to $10 million, the display is updated to include a results list 220 comprising search result 222 and 224, which are included in the updated display as a selectable results list of real property listings.

Figure 5:
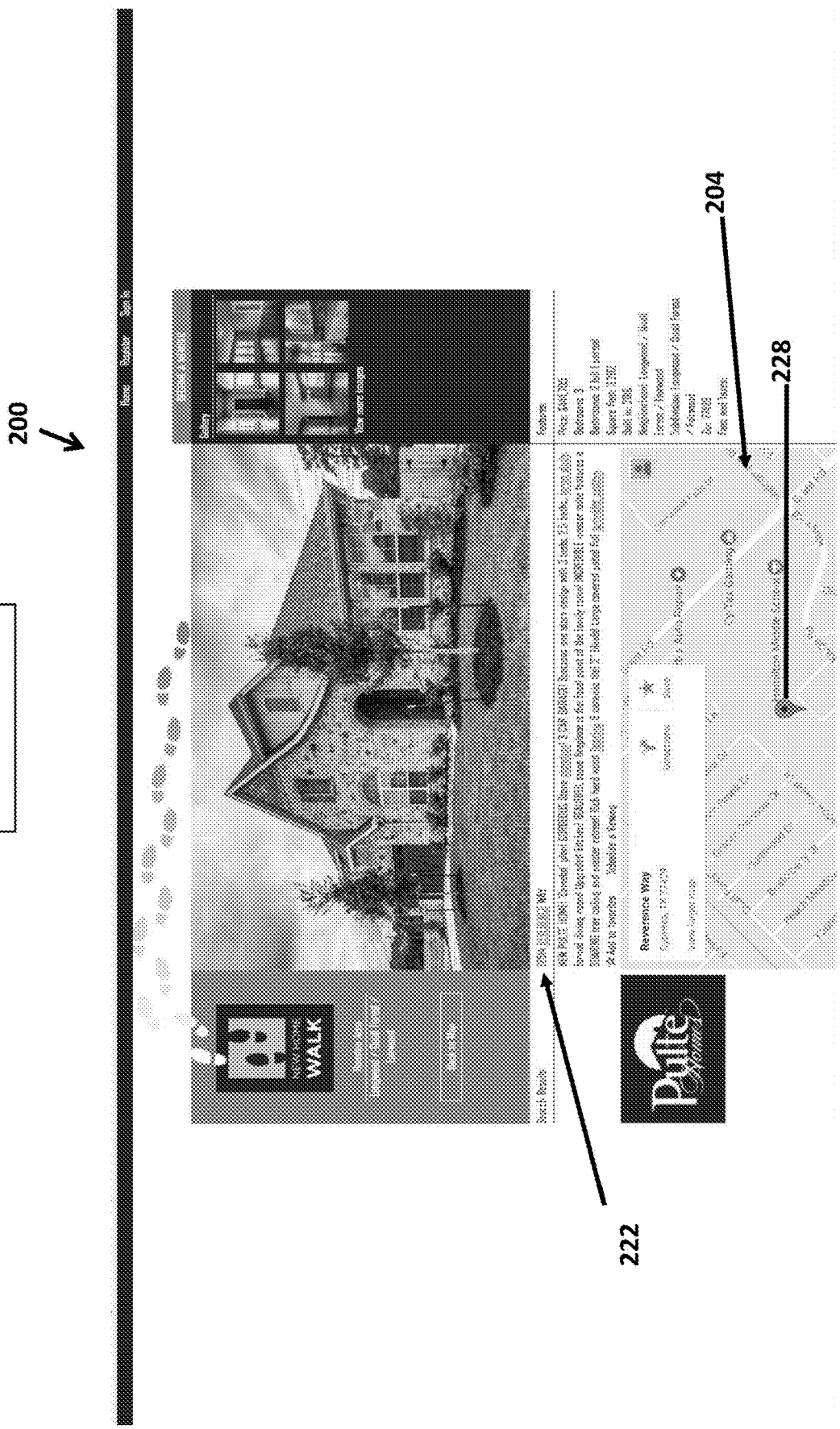
FIG. 5 shows the result of selecting a real property listing from the list of search results in which the geographic map has been updated to further comprise a status flag indicating the physical location and the listing status of the selected real property listing.

User selection of one of the search results from the results list results in the display being updated, as shown in FIG. 5 to include more information about the selected search result. The selection further updates the geographical map 204 such that geographic map further comprises one or more status flags 228, which indicates the physical location of the selected real property listing 222 present in the search result 220 (see FIG. 4), along with an indication of the listing status of the corresponding real property listing.

In embodiments, the graphical user interface may include the various fields, e.g., the search entry interface, the geographical map, the listing of the search results, and the like, adjacent to one another. In other embodiments, one or more of the fields may be located on separate display pages, and/or may be updated to be included in the display upon selection, with the corresponding removal of another of the fields.

In an embodiment, a user interface may include various map control features. For example, tools, such as those that may enable a user to select other features such as zooming, panning, and viewing the map through different views, such as a road view, aerial view, hybrid view or bird's eye view, and the like. A user may be able to zoom in and out and/or pan using the controls. In some instances, a user may be able to pan a map by clicking and dragging as well. In some instances, such navigational controls may be provided in a minimal display that may take up little space. A tool may be provided that may enable a user to enter an address or location, and that may automatically zoom and/or center the map at that location. The user can see a measurement index at foot of map, all of which are commonly available and readily known in the art.

A map may show only major street names and exclude side streets that are not helpful in determining where a property is located. Alternatively, it may be specified (by the user or system) whether the maps show the side streets. It may also be specified (by the user or system) whether the map shows any other geographic features that may be helpful for determining property location or surroundings. For example, the map may show gas stations as a landmark.

As previously discussed, aerial maps may be used, which may utilize satellite, aircraft, or other imagery. This may or may not be used in conjunction with a road/street view and/or other views, such as a topographic view, geological information view, zoning view, and the like.

A control toolbar may be reflective of the mapping software platform that is being used, or may be displayed independently of the mapping platform. For instance, if the graphical user interface is utilizing a particular mapping solution, a control toolbar may be provided by the mapping solution. The various features of the navigational bars may be located in any manner to enable a user to control the map view.

In embodiments, the user may also include non-spatial criteria which may include information about the listing such as desired square footage, lot square footage, number of bedrooms, number of bathrooms, property status, property type, price range, list/sale date, and the like. For instance, a user may be searching for a single family residential house with four bedrooms and two bathrooms within a price range from $200,000 to $500,000 within one more selected search zones and/or the selected sub-level neighborhood search areas.

Conducting a search, i.e., receiving a search request or receiving a search initiation input from the user, may direct a user to a map results page, which may show the selected shape with flags indicating the positions of the listings found within the search area. The search results may yield any number of results that fall within the desired area and numbered flags may appear on a map to show the location of the results, while a corresponding list on the side may show the addresses of the results. The corresponding list may include numbered flags that correspond to the numbered flags on the map. Such flags may be color-coded to represent different statuses of properties, whether they are active, sold, and the like. Such statuses may be specified during a search.

Any other flag indicator or marker known in the art may be used to indicate property listings that meet the spatial and/or non-spatial criteria. The destination indicator or marker may have any shape or configuration known in the art including but not limited to pins, arrows, and the like. In embodiments, each of the property listings may correspond directly to a real property listing. Alternatively, only some of the property listings may be displayed (e.g., the top five, or the ones within a particular area). In some instances, user interaction with a flag indicator may cause additional information about the real property listing denoted by the flag indicator to be displayed. In embodiments, the additional information can be customized by the user to select the information and presentation most relevant to his or her needs. This customization can be associated with a saved search so that the best presentation is automatically provided whenever that saved search is re-performed. Since one user may have several saved searches, each used for a different purpose, this allows the relevant information to be displayed instantly without the user having to describe it each time.

In some embodiments, after conducting a search, a user may toggle back to a map search view. In some embodiments the map search views and map results views may be shown as tabs that a user may switch between. Other user interfaces known in the art may be used to display a map search and map results view for a user, including but not limited to arrows, separate windows, links, and the like.

In embodiments, a map results view may also include additional geographic information, which may be integrated into the geographic map. Some examples of such geographic information may include school district boundaries, demographic information, heat maps, parcel boundaries, tax information, zoning information, geological information, topological information, the location of known sex offenders, e.g., as may be obtained from kidslivesafe.com, or any other geographic information. Such geographic information may be provided or displayed as data layers.

A user may return to a map search view, which may show the selected areas and non-spatial criteria that may be used to search. In some embodiments of the invention, a user may be able to modify the selected areas. For example, if a user wished to change the upper level zone or the selected sub-zones, a user may be able to click on the desired zone to selected it, or click on the selected zone to deselect it. Any such change will result in a corresponding change in the search results.

In embodiments, a user may click on a button that may erase all the selected areas from a map, leaving it clear for a user to make new selections if the user desires. After selected areas on a map may be modified, a user may perform additional searches within the newly modified selected areas. A user may be able to conduct different types of searches. For example, a user may conduct a quick search which may not allow a user to specify all the criteria, a map search which may enable a user to specify spatial and non-spatial criteria, an advanced search which may provide additional criteria and features, or a tax search. A user may also access saved searches.

In embodiments, any search may be saved in a "saved search" feature which may be recalled at a later time. For example, if a user selects several areas on a map and wishes to save that selection, a user may save the search, and be able to recall it at a later time. The graphical user interface may be able to save an unlimited number of searches or may have a limited number of searches that may be saved.

When a user accesses a saved search, the user may be able to modify the existing search criteria. For example, pulling up an existing search may populate a geographic map with the saved selected search zones or sub-level areas, and the search entry interface with the selected search criteria.

In embodiments, methods may be provided of conducting real property searches utilizing the graphical user interface. In embodiments, a method for searching multiple listings comprises providing one or more electronic databases which include real property listings from new home construction subscribers, including prospective real property listings under construction, multiple real property listings from the same new home construction subscriber, and real property listings of existing properties provided by a multiple listing service, providing a graphical user interface showing real estate search results on an interactive display device comprising a plurality of user selectable, predefined search zones displayed on a geographic map, each search zone comprising at least one user selectable sub-level neighborhood search area, wherein each sub-level neighborhood search area comprises a predefined geographical area bounded by the search zone which represents a predefined geographical area unified under a single neighborhood name, and a search interface configured for user input of at least one additional search criteria and for user initiation of a computerized search of real property listings in one or more electronic databases to produce a search result; the interface configured such that a user selection of a search area comprising one or more search zones and/or one or more sub-level neighborhood search areas results in the geographic map displaying the bounds of the selected search area, which is displayed on the geographic map in context to non-selected search zones and non-selected sub-level neighborhood search areas that are also displayed on the geographic map; receiving a selection of at least one sub-level neighborhood search area, at least one additional search criteria from a user, receiving a user search initiation input; conducting a computerized search of the one or more electronic databases to produce a search result comprising real property listings retrieved from the one or more electronic databases which include real property listings present in the selected search area which satisfy the at least one additional search criteria, and updating the display with a selectable results list comprising the real property listings of the search result.

In embodiments, the method further comprises receiving a selection from the selectable list of real property listings present in the search results, and updating the display to include one or more status flags indicating a physical location of the selected real property listing present in the search results, and further indicating an attribute, a listing status, or both, of the corresponding real property listing. In embodiments, the one or more additional search criteria includes a real property listing attribute. In embodiments, the method further comprises saving the search result. In embodiments, the user is a real estate agent, a real property appraiser, a property seller, a prospective customer, or a combination thereof.

In embodiments, the method further comprises receiving a selection from the user indicating which real property listings to visit, and generating a travel route from a starting point which directs the user to the physical location of each of the selected real property listings in the search results. In embodiments, the travel route comprises computer readable instructions downloadable into, and actionable by a portable electronic device capable of utilizing a GPS system to provide real-time navigational directions, wherein the instructions guide the user along the travel route to the physical location of each of the selected real property listings in the search results, and wherein the starting point is determined relative to the user's physical location. In embodiments, the computer readable instructions provide the user with a displaying of a visual image, a playing of an audio description, a playing of a video tour, or a combination thereof on the portable electronic device when the physical location of the user is proximate to the physical location of the corresponding real property listing.

Any of the methods described herein are provided by way of example only, and any of the steps or features discussed may be optional or interchangeable with other steps or features.

Embodiments Listing

The following embodiments are contemplated herein.

E1. A graphical user interface showing real estate search results on an interactive display device, the graphical user interface comprising:
   a plurality of user selectable, predefined search zones displayed on a geographic map, each search zone comprising at least one user selectable sub-level neighborhood search area comprising a predefined geographical area unified under a single neighborhood name bounded by the search zone;
   a search interface configured for a user input of at least one additional search criteria and for user initiation of a computerized search of the search area for real property in one or more electronic databases to produce the search result, the search result comprising user selectable real property listings physically located within the selected search area which satisfy the at least one additional search criteria;
   the one or more electronic databases comprising real property listings from home construction providers, real property listings under construction, prospective real property listings on which construction has not begun, real property listings available for construction, prospective real property listings not having an assigned physical address, or a combination thereof.

E2. The graphical interface according to embodiment E1, wherein the one or more electronic databases include real property listings from a multiple listing service.

E3. The graphical interface according to embodiment E1 or E2, wherein a selection of a real property listing from the results list updates the geographic map to further comprise at least one status flags indicating a physical location of the selected real property listing from the results list, the status flag further indicating an attribute, a listing status, or both, of the corresponding real property listing.

E4. The graphical interface according to any one of embodiments E1 through E3, wherein user selection of the search zone results in an update of the geographical map display to show the user selectable sub-level neighborhood search areas present in the selected search zone.

E5. The graphical interface according to any one of embodiments E1 through E4, wherein at least one of the sub-level neighborhood search areas is unified under a name of a real-estate development located within the defined geographic area.

E6. The graphical interface according to any one of embodiments E1 through E5, further comprising additional geographic information that is integrated into the geographic map.

E7. The graphical interface according to embodiment E6, wherein the additional geographic information includes indications which show school district boundaries, demographic information, heat maps, parcel boundaries, tax information, or a combination thereof, on the geographic map.

E8. The graphical interface according to embodiment E6 or E7, wherein one or more of the additional geographic information is displayed in one or more data layers on the geographic map, and wherein the user may select at least one additional geographic information to display on the geographic map.

E9. The graphical interface according to any one of embodiments E1 through E8, wherein the geographic map is integrated with at least one pre-existing map feature on the display device, and with at least one pre-existing toolbar.

E10. The graphical interface according to any one of embodiments E1 through E9, configured to allow the user to select which real property listings to visit, and wherein the display includes a travel route from a starting point which directs the user to the physical location of each of the selected real property listings in the search results.

E11. The graphical interface according to embodiment E10, wherein the travel route comprises computer readable instructions downloadable into, and actionable by a portable electronic device capable of utilizing a GPS system to provide real-time navigational directions, wherein the instructions guide the user along the travel route to the physical location of each of the selected real property listings in the search results, and wherein the starting point is determined relative to the user's physical location.

E12. The graphical interface according to embodiment E10 or E11, wherein the computer readable instructions provide the user with a displaying of a visual image, a playing of an audio description, a playing of a video tour, or a combination thereof on the portable electronic device when the physical location of the user is proximate to the physical location of the corresponding real property listing.

M1. A method for searching multiple listings comprising:
providing one or more electronic databases which include real property listings from new home construction subscribers, including prospective real property listings under construction, multiple real property listings from the same new home construction subscriber, and real property listings of existing properties provided by a multiple listing service;
providing a graphical user interface according to any one of embodiments E1 through E12; receiving a selection of at least one sub-level neighborhood search area, at least one additional search criteria from a user, receiving a user search initiation input; conducting a computerized search of the one or more electronic databases to produce a search result comprising real property listings retrieved from the one or more electronic databases which include real property listings present in the selected search area which satisfy the at least one additional search criteria, and updating the display with a selectable results list comprising the real property listings of the search result.

M2. A method for searching multiple listings comprising:
providing one or more electronic databases comprising real property listings from home construction providers, real property listings under construction, prospective real property listings on which construction has not begun, real property listings available for construction, prospective real property listings not having an assigned physical address, or a combination thereof;
providing a graphical user interface comprising a plurality of user selectable, predefined search zones displayed on a geographic map, each search zone comprising at least one user selectable sub-level neighborhood search area comprising a predefined geographical area unified under a single neighborhood name bounded by the search zone;
a search interface configured for a user input of at least one additional search criteria and for user initiation of a computerized search of the search area for real property in one or more electronic databases to produce the search result, the search result comprising user selectable real property listings physically located within the selected search area which satisfy the at least one additional search criteria;
receiving a selection of at least one sub-level neighborhood search area, at least one additional search criteria from a user,
receiving a user search initiation input;
conducting a computerized search of the one or more electronic databases to produce the search result comprising real property listings retrieved from the one or more electronic databases which include real property listings present in the selected search area which satisfy the at least one additional search criteria, and
updating the display with a selectable results list comprising the real property listings of the search result.

M3. The method according to embodiment M1 or M2, wherein the one or more electronic databases include real property listings from a multiple listing service.

M4. The method according to any one of embodiments M1 through M3, further comprising receiving a selection from the selectable list of real property listings present in the search results, and updating the display to include one or more status flags indicating a physical location of the selected real property listing present in the search results, and further indicating an attribute, a listing status, or both, of the corresponding real property listing.

M5. The method according to any one of embodiments M1 through M4, wherein the one or more additional search criteria includes a real property listing attribute.

M6. The method according to any one of embodiments M1 through M5, further comprising saving the search result.

M7. The method according to any one of embodiments M1 through M6, wherein the user is a real estate agent, a real property appraiser, a property seller, a prospective customer, or a combination thereof.

M8. The method according to any one of embodiments M1 through M7, further comprising receiving a selection from the user indicating which real property listings to visit, and generating a travel route from a starting point which directs the user to the physical location of each of the selected real property listings in the search results.

M9. The method according to embodiment M8, wherein the travel route comprises computer readable instructions downloadable into, and actionable by a portable electronic device capable of utilizing a GPS system to provide real-time navigational directions, wherein the instructions guide the user along the travel route to the physical location of each of the selected real property listings in the search results, and wherein the starting point is determined relative to the user's physical location.

M10. The method according to embodiment M8 or M9, wherein the computer readable instructions provide the user with a displaying of a visual image, a playing of an audio description, a playing of a video tour, or a combination thereof on the portable electronic device when the physical location of the user is proximate to the physical location of the corresponding real property listing.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

I claim:

1. An interactive display device featuring a graphical user interface showing real estate search results, the graphical user interface comprising:
   a plurality of user selectable, predefined search zones displayed on a geographic map, each search zone comprising at least one user selectable sub-level neighborhood search area comprising a predefined geographical area unified under a single neighborhood name bounded by the search zone;
   a search interface configured for a user input of at least one additional search criteria and for user initiation of a computerized search of the search area for real property in one or more electronic databases to produce a search result, the search result comprising user selectable real property listings physically located within the selected search area which satisfy the at least one additional search criteria;
   the one or more electronic databases comprising real property listings from home construction providers, real property listings under construction, prospective real property listings on which construction has not begun, real property listings available for construction, prospective real property listings not having an assigned physical address, or a combination thereof;
   wherein user selection of a particular search zone results in an update of the geographical map to show one or more user selectable sub-level neighborhood search areas present in the selected search zone.

2. The interactive display device of claim 1, wherein the one or more electronic databases include real property listings from a multiple listing service.

3. The interactive display device of claim 1, wherein the interface is configured such that the search result comprises the geographic map displaying the bounds of the selected search area in context to non-selected search zones and non-selected sub-level neighborhood search areas.

4. The interactive display device of claim 1, wherein the geographic map further comprises at least one indication flag indicating a physical location of a real property listing from the search result, the indication flag further indicating an attribute, a listing status, or both, of the corresponding real property listing.

5. The interactive display device of claim 4, wherein the indication flag indicates if a real property listing is under construction, a phase of the construction relative to completion, a prospective completion date of the construction, if amenities of the construction may be changed prior to completion, an estimated average commute times to a user selected location, or a combination thereof.

6. The interactive display device of claim 1, wherein the geographic map further indicates school district boundaries, demographic information, heat maps, parcel boundaries, tax information, or a combination thereof.

7. The interactive display device of claim 1, wherein the geographic map comprises one or more user selectable data layers.

8. The interactive display device of claim 1, wherein at least one of the sub-level neighborhood search areas is unified under a name of a real-estate development.

9. The interactive display device of claim 1, wherein the geographic map is integrated with at least one pre-existing map feature on the display device, and with at least one pre-existing toolbar.

10. The interactive display device of claim 1, configured to allow the user to select which real property listings to visit, and wherein the display includes a travel route from a user selectable starting point which directs the user to the physical location of each of the selected real property listings in the search results.

11. The interactive display device of claim 10, wherein the travel route comprises computer readable instructions downloadable into, and actionable by a portable electronic device capable of utilizing a GPS system to provide real-time navigational directions, wherein the instructions guide the user along the travel route to the physical location of each of the selected real property listings in the search results, and wherein the starting point is determined relative to the user's physical location.

12. The interactive display device of claim 10, wherein the computer readable instructions result in a display of a visual image, a playing of an audio description, a playing of a video tour, or a combination thereof on a portable electronic device when a physical location of the portable electronic device is proximate to the physical location of the corresponding real property listing.

13. A method for searching multiple listings comprising:
   providing one or more electronic databases comprising real property listings from home construction providers, real property listings under construction, prospective real property listings on which construction has not begun, real property listings available for construction, prospective real property listings not having an assigned physical address, or a combination thereof;
   providing a graphical user interface comprising a plurality of user selectable, predefined search zones displayed on a geographic map, each search zone comprising at least one user selectable sub-level neighborhood search area comprising a predefined geographical area unified under a single neighborhood name bounded by the search zone;

wherein user selection of a particular search zone results in an update of the geographical map to show one or more user selectable sub-level neighborhood search areas present in the selected search zone;

a search interface configured for a user input of at least one additional search criteria and for user initiation of a computerized search of the search area for real property in one or more electronic databases to produce the search result, the search result comprising user selectable real property listings physically located within the selected search area which satisfy the at least one additional search criteria;

receiving a selection of at least one sub-level neighborhood search area, at least one additional search criteria from a user;

receiving a user search initiation input;

conducting a computerized search of the one or more electronic databases to produce the search result comprising real property listings retrieved from the one or more electronic databases which include real property listings present in the selected search area which satisfy the at least one additional search criteria; and updating the display with a selectable results list comprising the real property listings of the search result.

14. The method of claim 13, wherein the one or more electronic databases include real property listings from a multiple listing service.

15. The method of claim 13, further comprising receiving a selection from the selectable list of real property listings present in the search results, and updating the display to include one or more indication flags indicating a physical location of the selected real property listing present in the search results on the geographic map, and further indicating an attribute, a status, or both, of the corresponding real property listing.

16. The method of claim 13, wherein the one or more additional search criteria includes a real property listing attribute.

17. The method of claim 13, further comprising saving the search result.

18. The method of claim 13, wherein the user is a real estate agent, a real property appraiser, a property seller, a prospective customer, or a combination thereof.

19. The method of claim 13, further comprising receiving a selection from the user indicating which real property listings to visit, and generating a travel route from a starting point which directs the user to the physical location of each of the selected real property listings in the search results.

20. The method of claim 19, wherein the travel route comprises computer readable instructions downloadable into, and actionable by a portable electronic device capable of utilizing a GPS system to provide real-time navigational directions, wherein the instructions guide the user along the travel route to the physical location of each of the selected real property listings in the search results, and wherein the starting point is determined relative to the user's physical location.

21. The method of claim 20, wherein the computer readable instructions provide the user with a displaying of a visual image, a playing of an audio description, a playing of a video tour, or a combination thereof on the portable electronic device when the physical location of the user is proximate to the physical location of the corresponding real property listing.

* * * * *